United States Patent
Sampath et al.

(10) Patent No.: US 12,026,597 B2
(45) Date of Patent: Jul. 2, 2024

(54) DEVICE IDENTIFIER CLASSIFICATION

(71) Applicant: Hewlett Packard Enterprise Development LP, Spring, TX (US)

(72) Inventors: Rangaprasad Sampath, Karnataka (IN); Madhusoodhana Chari Sesha, Karnataka (IN); Sriharsha Tallapakam, Karnataka (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

(21) Appl. No.: 18/158,651

(22) Filed: Jan. 24, 2023

(65) Prior Publication Data
US 2023/0162094 A1 May 25, 2023

Related U.S. Application Data

(63) Continuation of application No. 16/039,676, filed on Jul. 19, 2018, now Pat. No. 11,586,971.

(51) Int. Cl.
*H04L 67/52* (2022.01)
*G06N 20/00* (2019.01)
(Continued)

(52) U.S. Cl.
CPC .......... *G06N 20/00* (2019.01); *H04L 67/535* (2022.05); *H04L 67/52* (2022.05); *H04L 2101/622* (2022.05)

(58) Field of Classification Search
None
See application file for complete search history.

(56) References Cited

U.S. PATENT DOCUMENTS 6,556,541 B1 * 4/2003 Bare ................ H04L 45/586
370/396
9,165,051 B2 10/2015 Masud et al.
(Continued)

FOREIGN PATENT DOCUMENTS

| CN | 104348741 A | 2/2015 |
| CN | 104767692 A | 7/2015 |
| WO | 01/84774 A2 | 11/2001 |

OTHER PUBLICATIONS

"Aruba 8400 Core and Aggregation Switch", available online at <https://web.archive.org/web/20180515121540/http://www.arubanetworks.com/aruba-8400/>, May 15, 2018, 5 pages.
(Continued)

*Primary Examiner* — James A Edwards
(74) *Attorney, Agent, or Firm* — Hewlett Packard Enterprise Patent Department

(57) ABSTRACT

An example method can include tracking, by a network device, a plurality of attributes associated with a plurality of unique client device identifiers stored in a tracking table; deriving, by the network device, a training data set based on the plurality of attributes; and generating, by the network device, a plurality of clusters by inputting the derived training data set to an unsupervised machine learning mechanism. The example method can include receiving, by the network device, a labeling of the plurality of unique client device identifiers in the tracking table based at least on the plurality of clusters; generating, by the network device, a plurality of classifiers by inputting the labelled tracking table to a supervised machine learning mechanism; and classifying, by the network device, a new unique client device identifier in the tracking table based at least on the plurality of classifiers.

20 Claims, 5 Drawing Sheets

(51) Int. Cl.
*H04L 67/50* (2022.01)
*H04L 101/622* (2022.01)

(56) References Cited

U.S. PATENT DOCUMENTS

| | | | |
|---|---|---|---|
| 9,697,248 | B1 | 7/2017 | Ahire |
| 9,985,984 | B1 | 5/2018 | Chavez et al. |
| 10,079,711 | B1* | 9/2018 | Hayes .................. G06F 12/10 |
| 2004/0015719 | A1 | 1/2004 | Lee et al. |
| 2008/0004904 | A1 | 1/2008 | Tran |
| 2009/0222395 | A1 | 9/2009 | Light et al. |
| 2009/0296727 | A1 | 12/2009 | Srinivasan |
| 2010/0150136 | A1* | 6/2010 | Houle .................. H04L 41/0856 370/352 |
| 2012/0222097 | A1 | 8/2012 | Wilson et al. |
| 2013/0013542 | A1 | 1/2013 | Sen et al. |
| 2013/0212213 | A1 | 8/2013 | Kim |
| 2013/0317944 | A1* | 11/2013 | Huang .................. G01S 5/02521 455/457 |
| 2014/0379911 | A1 | 12/2014 | Fayssal et al. |
| 2016/0336006 | A1* | 11/2016 | Levit .................. G10L 15/063 |
| 2017/0104634 | A1 | 4/2017 | Yermakov et al. |
| 2017/0171737 | A1 | 6/2017 | Mestanov et al. |
| 2017/0302553 | A1* | 10/2017 | Zafer .................. H04L 41/142 |
| 2017/0339187 | A1 | 11/2017 | Papamartzivanos et al. |
| 2017/0374090 | A1 | 12/2017 | McGrew et al. |
| 2018/0082172 | A1 | 3/2018 | Patel et al. |
| 2018/0219882 | A1 | 8/2018 | Boatwright |
| 2018/0248795 | A1* | 8/2018 | Nainar .................. H04L 12/4641 |
| 2018/0315089 | A1 | 11/2018 | Nash et al. |
| 2019/0253309 | A1 | 8/2019 | Zhao et al. |
| 2019/0281078 | A1* | 9/2019 | Eguiarte Salazar .. H04L 63/162 |
| 2019/0294881 | A1 | 9/2019 | Polak et al. |
| 2020/0242488 | A1* | 7/2020 | Medas .................. G06N 5/01 |

OTHER PUBLICATIONS

"Weka 3: Data Mining Software in Java" available online at <https://web.archive.org/web/20180628074234/https://www.cs.waikato.ac.nz/ml/weka/>, Jun. 28, 2018, 1 page.

Abdullah A., Network Traffic Classification and Novelty Detection for Mobile Apps, (Research Paper), 2017, 3 Pgs.

Bujlow et al., "A Practical Method for Multilevel Classification and Accounting of Traffic in Computer Networks", Networking & Security Department of Electronic Systems, 2014, 71 pages.

Cavalcanti et al, On the Applicability of Mobility Metrics for User Movement Pattern Recognition in MANETs, MobiWac'13, Barcelona, Spain, Nov. 3-8, 2013, 8 Pgs.

Jason Brownlee, "Supervised and Unsupervised Machine Learning Algorithms", in Understand Machine Learning Algorithms, available online at <https://machinelearningmastery.com/supervised-and-unsupervised-machine-learning-algorithms/>, Mar. 16, 2016, 22 pages.

Location Analytics, Cisco, Retrieved Jun. 18, 2018, 23 Pgs.

Pimentel et al., "A review of Novelty Detection", Signal Processing, vol. 99, Jun. 2014, pp. 215-249.

Tom Black, "ArubaOS-CX: A Modern, Programmable Network for the Mobile and IoT Age", available online at <https://blogs.arubanetworks.com/solutions/arubaos-cx-a-modern-programmable-network-for-the-mobile-and-iot-age/>, Aug. 14, 2017, 3 pages.

Understanding Mac Limiting and Mac Move Limiting for Port Security on Ex Series Switches, Feb. 21, 2018, 3 Pgs.

Wei et al., Characterizing the Behavior of Handheld Devices and Its Implications, Elsevier B.V., 2017, 12 Pgs.

Wikipedia, "Decision Tree", available online at <https://en.wikipedia.org/w/index.php?title=Decision_tree&oldid=848408375>, Jul. 1, 2018, 3 pages.

Wikipedia, "Deep Packet Inspection (DPI)", available online at <https://en.wikipedia.org/w/index.php?title=Deep_packet_inspection&oldid=848569600>, Jul. 2, 2018, 6 pages.

Wikipedia, "Hypertext Transfer Protocol" available online at <https://en.wikipedia.org/wiki/Hypertext_Transfer_Protocol>, Jul. 15, 2018, 6 pages.

Wikipedia, "Information gain in decision trees", available online at <https://en.wikipedia.org/w/index.php?title=Information_gain_in_decision_trees&oldid=835750902>, Apr. 10, 2018, 1 page.

Wikipedia, "K-Means Clustering", available online at <https://en.wikipedia.org/w/index.php?title=K-means_clustering&oldid=850272066>, Jul. 14, 2018, 6 pages.

Wikipedia, "Machine Learning", available online at <https://en.wikipedia.org/w/index.php?title=Machine_learning&oldid=849817385>, Jul. 11, 2018, 7 pages.

* cited by examiner

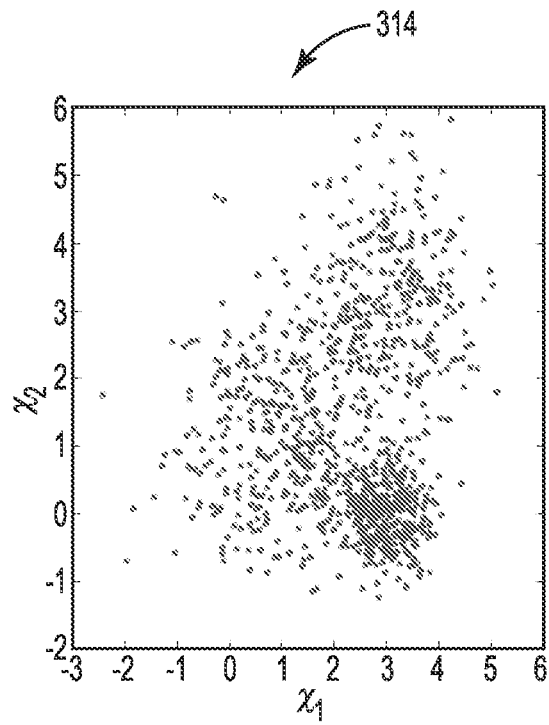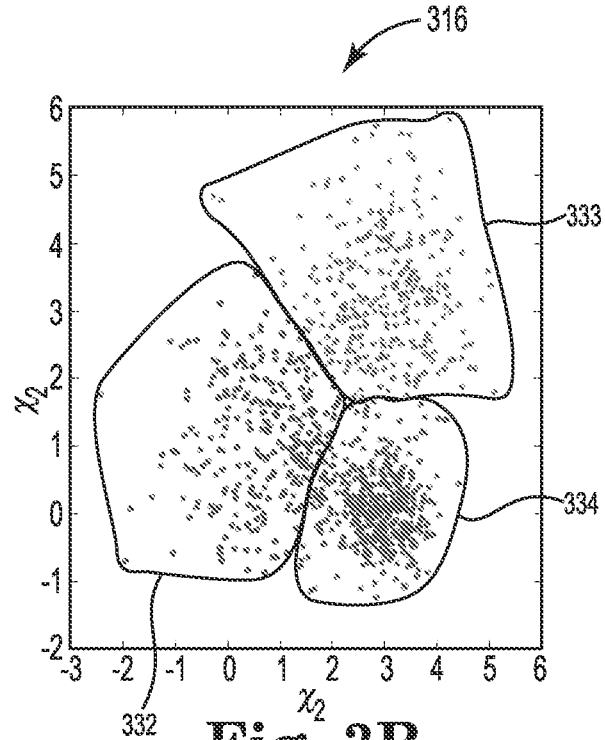
Fig. 3A
Fig. 3B
| MAC | VLAN | PORT |
|---|---|---|
| A | 1 | 2 |
| B | 3 | 2 |
| C | 11 | 32 |
| D | 11 | 32 |
| E | 4 | 32 |
| F | 1 | 2 |
Fig. 4A
| MAC | UPTIME | #DELETES | #PORT MOVES | CLASS LABEL |
|---|---|---|---|---|
| A | 28 | 2 | 0 | PERMANENT |
| B | 24 | 5 | 2 | PERMANENT |
| C | 28 | 2 | 10 | INTERMITTENT |
| D | 24 | 5 | 12 | INTERMITTENT |
| E | 28 | 25 | 0 | FREQUENT |
| F | 24 | 20 | 2 | FREQUENT |
Fig. 4B

DEVICE IDENTIFIER CLASSIFICATION

CROSS REFERENCE TO RELATED APPLICATIONS

This application is a continuation of, and claims the priority benefit of, U.S. patent application Ser. No. 16/039,676, filed on Jul. 19, 2018, now U.S. Pat. No. 11,586,971, which is incorporated herein by reference in its entirety.

BACKGROUND

A network, also referred to as a computer network or a data network, is a digital telecommunications network which allows nodes (e.g., computing devices, network devices, etc.) to share resources. In networks, nodes exchange data with each other using connections (e.g., data links) between nodes. These connections can be established over cable media such as wires or optic cables, or wireless media such as a wireless local area network (WLAN).

BRIEF DESCRIPTION OF THE DRAWINGS

FIGS. 3A and 3B are example clustering diagrams consistent with the present disclosure.

FIGS. 4A and 4B are example unique client device identifier tables consistent with the present disclosure.

DETAILED DESCRIPTION

Figure 1:
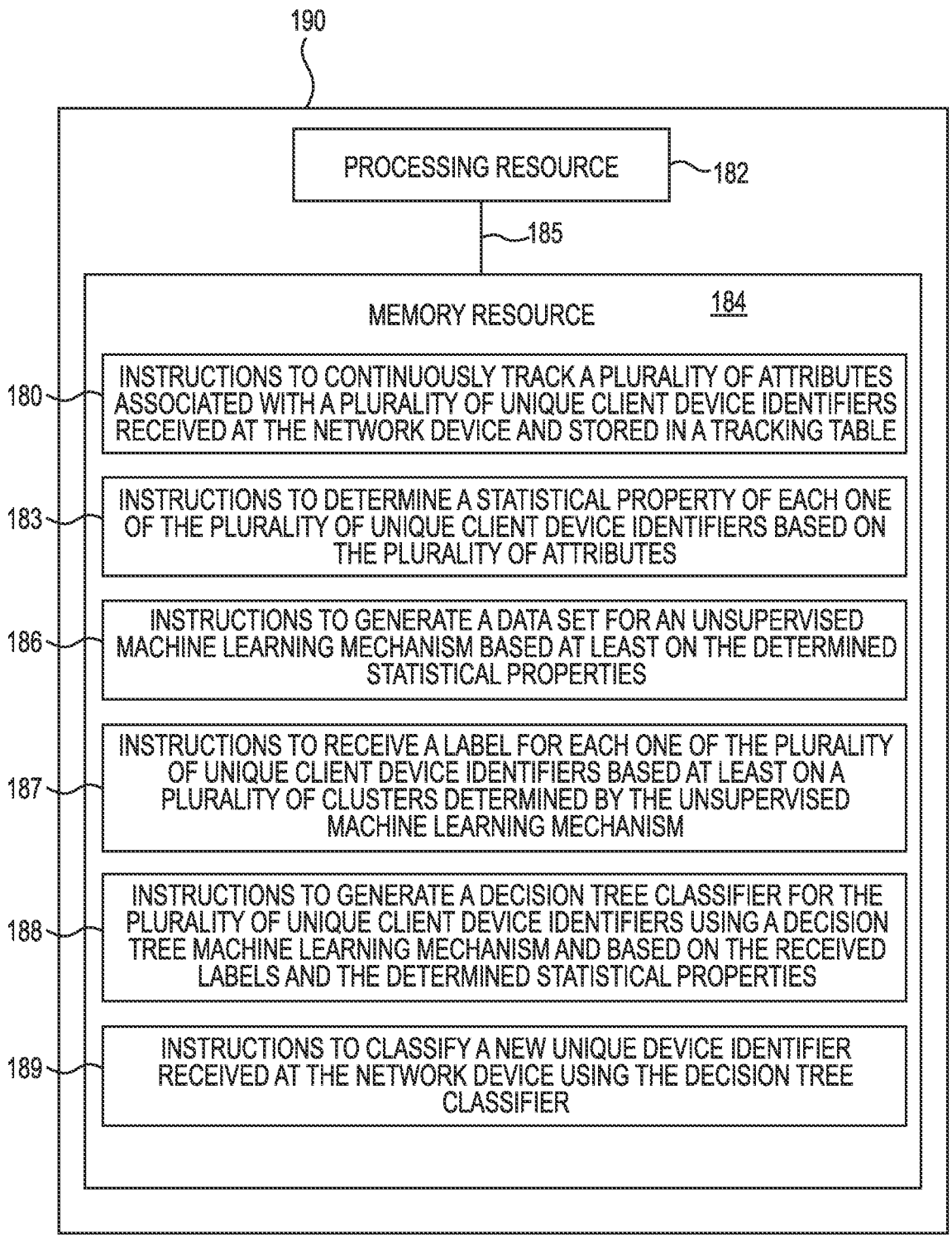
FIG. 1 is an example network device for device identifier classification including a processing resource and a memory resource consistent with the present disclosure.

Network devices such as network switching devices (e.g., switches) are deployed in varied customer environments across diverse enterprise customer segments such as hospitality, medical care, university, and enterprise campus, among others. Along with the network users varying among environments, applications and types of network devices vary among environments. In addition, different network users may use multiple network devices (e.g., laptops, personal computers (PCs), tablets, mobile phones, etc.) to connect to the network.

Knowledge about this usage information can be referred to as network user visibility. For instance, network user visibility components can include patterns of movement of network users across a physical and/or geographical environment (e.g., university, airport, shopping mall, hospital, enterprise, etc.), what groups of network users are together, what periods of times the groups of users are together, static/dynamic status of a network, what fraction of static network users become dynamic and vice versa, among others.

Some approaches to gaining network user visibility include tracking Internet Protocol (IP) addresses and/or relying on known or user-defined bounds and thresholds. For instance, in such an example, if a client device with a unique identifier (referred to herein as a "unique client device identifier"), moves X times within a time window t1, it may be classified as a dynamic client on its associated network, and if a client device with a unique identifier Y does not change at all for a time interval t2, it may be classified as a static client on its associated network. As used herein, a unique client device identifier is an identifier associated with a particular device that is unique to that device. An example unique client device identifier is a media access control (MAC) address. A MAC address, as used herein is a unique client device identifier assigned to a network interface controller (NIC) for communications at a data link layer of a network segment. Other examples of unique client device identifiers may include, but not limited to, unique device identifier (UDI) in human- and machine-readable form, Organizationally Unique Identifier (OUI), etc.

In the example approach above, values of time interval t1 and/or time interval t2 may differ widely for different network deployments across various customer segments. For instance, an airport network administrator may observe a larger number of users connecting than a network administrator in a university campus (depending on enrollment), but the average connection duration at the airport may be shorter than the average connection duration on the university campus. Connections at the university campus may include groups of network users changing at fixed times between various buildings as classes are held at various locations on campus, for instance. Such approaches, in some instances, make determinations outside of a network device (e.g., switching device, router, etc.) and then send the information to the network device. This can result in bandwidth issues and user dissatisfaction because multiple devices (e.g., more than just the network device) may be necessary to make network user visibility determinations.

Examples of the present disclosure provide for network user visibility using machine learning on a network device. For instance, a given network deployment can be determined, underlying network patterns can be recognized, and conclusions and/or decisions can be made based on those patterns. A network pattern can include a pattern of user and/or device behavior and/or network traffic patterns over a particular period of time. For instance, some examples of the present disclosure can allow for a network device itself, such as a switching device, to continuously learn network user movements, recognize network patterns, and transform the patterns into insights. Such patterns and/or insights can yield information regarding network utilization, network reachability, and network user behavior, among others, which can be used for network provisioning of value-added services in the network and network capacity planning. As used herein, insights can include clues, information, and/or other data about the network that can improve network visibility. For instance, a pattern may be that devices on an airport network are connecting for a short period of time during certain hours of the day. An insight that comes from this pattern may be that users at an airport are on their devices for short periods of time at certain times of the day. This may indicate a desire for increased network capability at those times. In some instances, a network administrator may choose to shorten a time period for free services because the pattern provided the insight that users do not use the free services for longer periods of time.

Some examples of the present disclosure can affect the functionality of a network device (e.g., improve the functionality), such that the network device can perform functions associated with network user visibility. By determining and using statistical properties and/or attributes associated with unique client device identifiers gathered from observations of changes in network user behavior, enhanced network user visibility can be attained, which can improve network performance, for instance, by being used for network provisioning determinations, security profiling determinations, network anomaly identification, and bandwidth allocation determinations, among others.

FIG. 1 is an example network device 190 for device identifier classification including a processing resource 182 and a memory resource 184 consistent with the present disclosure. A network device, as used herein includes a device (e.g., physical device) used for communication and interaction between devices on a computer network. Network devices, such as network device 190 can mediate data in a computer network. Example network devices include switching devices (also known as "switches"), routers, router/switching device combinations, models, access points, gateways, networking cables, network interface controllers, and hubs, among others. In some instances, network device 190 can be or include a controller. Network device 190 can be a combination of hardware and instructions for device identifier classification. The hardware, for example can include processing resource 182 and/or a memory resource 184 (e.g., MRM, computer-readable medium (CRM), data store, etc.).

Processing resource 182, as used herein, can include a number of processing resources capable of executing instructions stored by a memory resource 184. The instructions (e.g., machine-readable instructions (MRI)) can include instructions stored on the memory resource 184 and executable by the processing resource 182 to implement a desired function (e.g., device identifier classification). The memory resource 184, as used herein, can include a number of memory components capable of storing non-transitory instructions that can be executed by processing resource 182. Memory resource 184 can be integrated in a single device or distributed across multiple devices. Further, memory resource 184 can be fully or partially integrated in the same device as processing resource 182 or it can be separate but accessible to that device and processing resource 182. Thus, it is noted that the edge device 190 can be implemented on an electronic device and/or a collection of electronic devices, among other possibilities.

The memory resource 184 can be in communication with the processing resource 182 via a communication link (e.g., path) 185. The communication link 185 can be local or remote to an electronic device associated with the processing resource 182. The memory resource 184 includes instructions 180, 183, 186, 187, 188, and 189. The memory resource 184 can include more or fewer instructions than illustrated to perform the various functions described herein. In some examples, instructions (e.g., software, firmware, etc.) 180, 183, 186, 187, 188, and 189 can be downloaded and stored in memory resource 184 (e.g., MRM) as well as a hard-wired program (e.g., logic), among other possibilities.

Instructions 180, when executed by a processing resource such as processing resource 182 can continuously track a plurality of attributes associated with a plurality of unique client device identifiers received at the network device and stored in a tracking table. For instance, network device 190 can continuously track unique client device identifiers based on traffic that is incipient on its ports, and the information can be stored in a table, as illustrated in FIG. 4A discussed further herein. These unique client device identifiers can represent network devices on the network that are sending traffic on the network. Continuously tracking, as used herein, can include without meaningful breaks in the tracking. For instance, operational circumstances can cause intermittent gaps in records (due to equipment failure, etc.), and "continuous tracking" includes tracking with intermittent or periodic gaps, whether planned or unplanned as well as tracking without intermittent or periodic gaps.

Instructions 183, when executed by a processing resource such as processing resource 182 can determine a statistical property of each one of the plurality of unique client device identifiers based on the plurality of attributes. For instance, by observing various changes that happen to each entry/record in the table, statistical properties such as a unique client device identifier uptime, an amount of unique client device identifier deletes and age-outs, and/or an amount of unique client device moves can be determined.

A unique client device identifier uptime, for instance, can include a cumulative time for which the unique client device identifier is present in the table from the time it is added, within a defined time interval t. The number of unique client device identifier deletes can include the number of times a given unique client device identifier is deleted from the table within the defined time interval t, while the number of unique client device identifier age-outs includes the number of times a given unique client device identifier ages out of the table within the defined time interval. As used herein, aging out can include expiring after a predetermined amount of time in the table. The number of unique client device moves can include a number of times a given unique client device identifier moves among ports on which it is learned within the defined time interval. For example, a give unique client device identifier A may be first learned on virtual local area network (VLAN) 1, Port 1, but then later learned on VLAN 1, Port 2, which would constitute a unique client device identifier move, and consequently, and unique client device move (e.g., a user moved a laptop from one port to another in a conference room).

In some examples, if the same unique client device identifier is observed after the defined time interval, it can be considered a new unique client device identifier. The defined time interval can be any time interval, for instance 60 minutes, 120 minutes, one day, etc.

Instructions 186, when executed by a processing resource such as processing resource 182 can generate a data set for an unsupervised machine learning mechanism based at least on the determined statistical properties. For instance, once the statistical properties are gathered in the same or a separate table, they can be made into a data set. Data cleaning operations such as removal of duplicate records can be performed, and data set attribute values can be normalized such that they are amenable to be fed into an unsupervised machine learning mechanism. In some instances, available data in the data set can be split into two parts such that 80 percent is used as training data and 20 percent is used as test data. The training data can be cross-validated. While an 80/20 split is disclosed herein, other training/test data splits can be used.

Instructions 187, when executed by a processing resource such as processing resource 182 can receive a label for each one of the plurality of unique client device identifiers based at least on a plurality of clusters determined by the unsupervised machine learning mechanism. For instance, the obtained data set is unlabeled because while statistical properties for each unique client device identifier is known, there is not a target label ascribed to each unique client device identifier entry of the table. An unsupervised machine learning mechanism, such as K-Means clustering, can be used on the data set to cluster the data set into categories, as illustrated in FIGS. 3A (unclustered) and 3B (clustered), as will be described further herein.

Post-clustering, the clusters can be named and records in each of those clusters can be given the cluster name as the label. For instance, if there are three clusters, the labels can include "frequent" for a unique client device identifier that constantly changes in the network, "permanent" for a unique client device identifier that rarely changes in the network, and "intermittent" for a unique client device identifier that is neither frequent nor intermittent. This is illustrated in FIG. 4B, as will be discussed further herein.

In some examples, a supervised learning mechanism can be used on the labeled data set to create a classifier for new incoming unique client device identifiers. An example supervised learning mechanism is a decision tree classifier supervised learning mechanism. For instance, instructions 188, when executed by a processing resource such as processing resource 182 can generate a decision tree classifier for the plurality of unique client device identifiers using a decision tree machine learning mechanism and based on the received labels and the determined statistical properties. A decision tree classifier, such as the decision tree in FIG. 5 (as will be discussed further herein), can be generated for classifying new, incoming unique client device identifiers.

For instance, instructions 189, when executed by a processing resource such as processing resource 182 can classify a new unique device identifier received at the network device using the decision tree classifier. Put another way, when network device 190 receives a new unique client device identifier, classification of the new unique client device identifier can include instructions 189 to track a plurality of attributes associated with the new unique device identifier, determine a statistical property of the new unique device identifier based on the plurality of attributes associated with the new unique device identifier, and classify the new unique device by inputting the statistical property into the decision tree machine learning mechanism. The output of the decision tree is a classification of the new unique client device identifier as permanent, intermittent, or frequent, for example.

Once the decision classifier is build, new unique client device identifiers can be classified dynamically as they are received by network device 190. As used herein, dynamically can include variable and/or constantly changing in response to a particular influence (e.g., a new unique client device identifier received by network device 190). The classification can be used to gain insights into network user activity and gain network user visibility.

Figure 2:
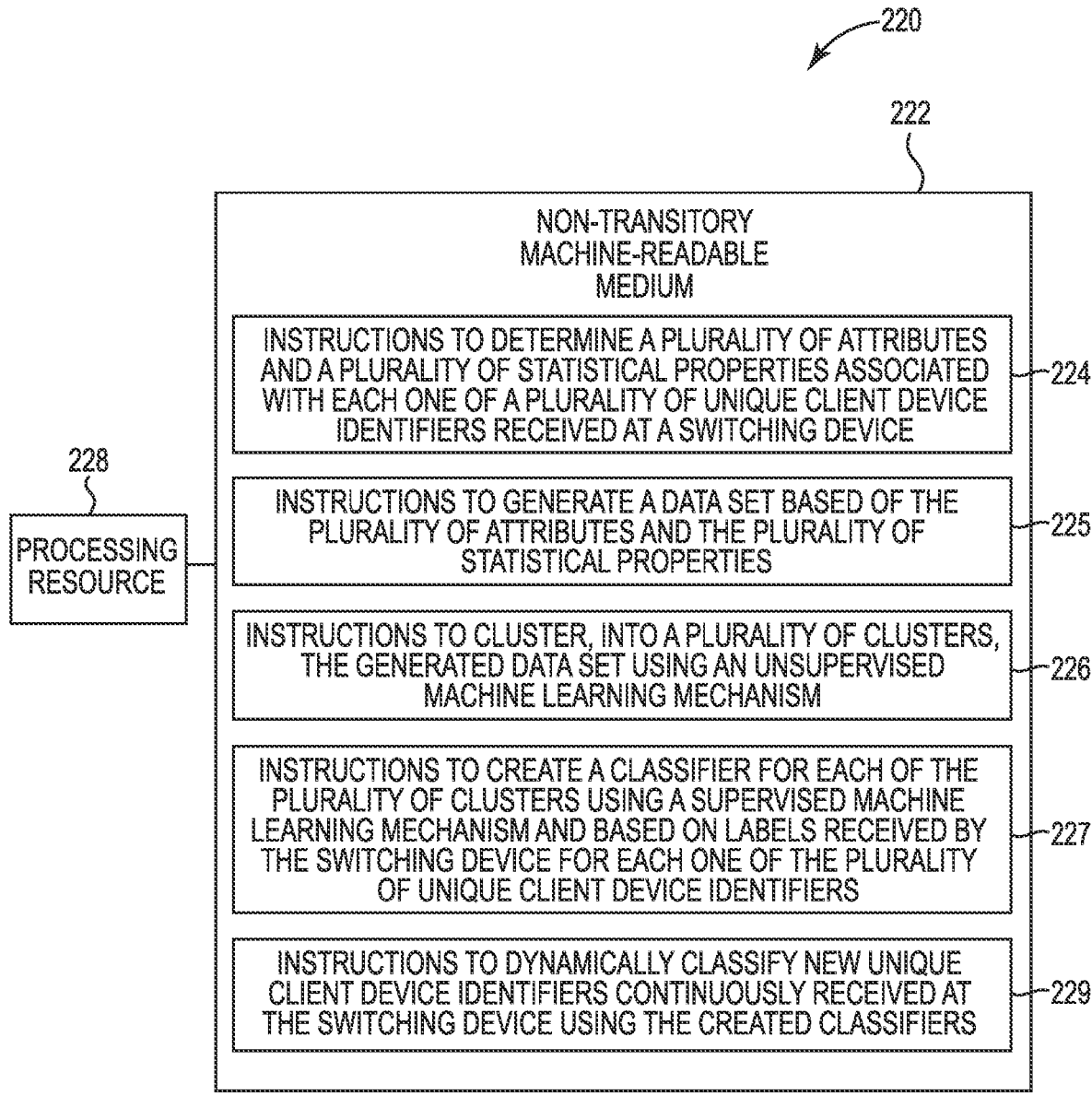
FIG. 2 is an example system for device identifier classification including a machine-readable medium (MRM) and a processing resource consistent with the present disclosure.

FIG. 2 is an example system 220 for device identifier classification including an MRM 222 and a processing resource 228 consistent with the present disclosure. In some examples, system 220 can be a device akin to network device 190 as illustrated in FIG. 1. For instance, system 220 can be a computing device in some examples and can include a processing resource 228. System 220 can further include a non-transitory MRM 222, on which may be stored instructions, such as instructions 224, 225, 226, 227, and 229. Although the following descriptions refer to a processing resource and an MRM, the descriptions may also apply to a system with multiple processing resources and multiple MRMs. In such examples, the instructions may be distributed (e.g., stored) across multiple non-transitory MRMs and the instructions may be distributed (e.g., executed by) across multiple processing resources. Processing resource 228 and non-transitory MRM 222 can be akin to the processing resource and memory resource described with respect to FIG. 1.

Non-transitory MRM 222 may be electronic, magnetic, optical, or other physical storage device that stores executable instructions. Thus, non-transitory MRM 222 may be, for example, Random Access Memory (RAM), an Electrically-Erasable Programmable Read-Only Memory (EEPROM), a storage drive, an optical disc, and the like on-transitory MRM 222 may be disposed within system 220, as shown in FIG. 2. In this example, the executable instructions 224, 225, 226, 227, and 229 may be "installed" on the device. Additionally and/or alternatively, non-transitory MRM 222 can be a portable, external or remote storage medium, for example, that allows system 220 to download the instructions 224, 225, 226, 227, and 229 from the portable/external/remote storage medium. In this situation, the executable instructions may be part of an "installation package". As described herein, non-transitory MRM 222 can be encoded with executable instructions for device identifier classification.

Instructions 224, when executed by a processing resource such as processing resource 228, can include instructions to determine a plurality of attributes and a plurality of statistical properties associated with each one of a plurality of unique client device identifiers received at a switching device. For instance, when a unique client device identifier is received at a network device, a plurality of attributes including a VLAN and port through which the unique client device identifier came in can be determined and a plurality of statistical properties such as a unique client device identifier uptime, a number of unique client device identifiers deletes and/or age-outs, and a number of unique client device moves can be determined.

Instructions 225, when executed by a processing resource such as processing resource 228, can include instructions to generate a data set based of the plurality of attributes and the plurality of statistical properties. Generating the data set can include, for instance, cleaning the data set, assigning a training subset of the data set, and assigning a testing subset of the data set, among others. The data set can be used in a machine learning mechanism, for example.

Instructions 226, when executed by a processing resource such as processing resource 228, can include instructions to cluster, into a plurality of clusters, the generated data set using an unsupervised machine learning mechanism. For instance, the unsupervised machine learning mechanism can be a K-Means clustering unsupervised machine learning mechanism with multiple dimensions, with each dimension corresponding to an attribute of the unique client device identifier.

Instructions 227, when executed by a processing resource such as processing resource 228, can include instructions to create a classifier for each of the plurality of clusters using a supervised machine learning mechanism and based on labels received by the switching device for each one of the plurality of unique client device identifiers. For instance, the classifier can be created using a decision tree supervised machine learning mechanism.

Instructions 229, when executed by a processing resource such as processing resource 228, can include instructions to dynamically classify new unique client device identifiers continuously received at the switching device using the created classifiers. The created classifiers, for example, can include an intermittent unique client device identifier, a permanent unique client device identifier, and a frequent unique client device identifier. An example decision tree classifier may include a root node classifying the new unique client device identifier based on a first attributed (e.g., number of unique client device identifier deletes and/or age-outs) and a leaf node based on a second attribute (e.g., number of unique client device moves).

Change patterns can be observed to make an inference associated with a network user behavior and network traffic determinations can be made based on dynamic classifications. For instance, if it is determined that an intermittent unique client device identifier has disappeared (e.g., a change pattern), it may be determined that a user, for instance at an airport, used the Internet while at the airport and then left. In another example, if it is determined that groups of frequent unique client device identifiers move together (e.g., a change pattern), it may be determined that the users are a group of students attending classes together or a group of friends shopping in a mall.

Another example network traffic determination may be that a permanent unique client device identifier has disappeared (e.g., a change pattern). Such a determination may indicate theft of a device or a device being permanently decommissioned (e.g., a printer being decommissioned). A network traffic determination of a permanent unique client device identifier becoming frequent (e.g., a change pattern) can indicate a student no longer using a local area network (LAN) connection on his or her PC and switching to a WLAN. Another example network traffic determination includes a determination of a set of frequent unique client device identifiers becoming permanent during nighttime hours (e.g., a change pattern). Such an indication may indicate students in a dorm using their LAN connections and not a WLAN during nighttime hours. Using these network traffic determinations/change patterns and resulting network user visibility, network performance changes/improvements can be made (e.g., when to increase bandwidth, security protocol updates, etc.). In some instances, inferences made can be provided to a network administrator to make a network management decision.

FIGS. 3A and 3B are example clustering diagrams 314 and 316 consistent with the present disclosure. FIG. 3A illustrates an example diagram 314 of unclustered data, while FIG. 3B illustrates an example diagram 316 of clustered data. Each point in diagrams 314 and 316 can represent a unique client device identifier received at a network device or a table row. The unlabeled data set received following preparation of the statistical properties data set can undergo an unsupervised machine learning mechanism, such that the unclustered data of diagram 314 is clustered into three non-overlapping and inclusive categories 332, 333, and 334, as illustrated in FIG. 3B. In other words, each unique client device identifier will be classified into one unique category among categories 332, 333, 334. While three categories are illustrated in FIG. 3B, more or fewer categories may be used.

In the examples illustrated in example diagrams 314 and 316, x1 can be a statistical property such as the number of unique client device identifier age-outs and/or deletes, and x2 can be another statistical property, such as the number of unique client device moves. x1 and x2 may represent other statistical properties in other examples. The clustering illustrated in example diagram 316 can be determined using a K-Means clustering unsupervised machine learning mechanism or other unsupervised machine learning clustering mechanism.

In the example illustrated in FIG. 3B, cluster 334 illustrates higher levels of x1 and lower levels of x2, which can indicate a permanent cluster classification (e.g., college students in a dorm), while cluster 333 illustrates higher levels of x2 and medium levels of x1. This may indicate a frequent cluster classification (e.g., airport travelers). Cluster 332 illustrating medium levels of both x2 and x1 may indicate an intermittent cluster classification (e.g., students in a class). In some examples, the labeling of the clusters can be performed by an administrator having domain expertise.

FIGS. 4A and 4B are example unique client device identifier tables 440 and 442 consistent with the present disclosure. FIG. 4A illustrates a unique client device identifier table 440 including unique client device identifier attributes, such as, Media Access Control (MAC) identifier 444, VLAN information 446 and port information 448. As traffic passes through a network device, a source unique client device identifier from each packet can be recorded by a network device, and a VLAN and port on which the traffic entered the network device is noted. In the example illustrated in FIG. 4A, unique client device identifier A entered the network device via VLAN 1 and port 2, unique client device identifier B entered the network device via VLAN 3 and port 2, and so on. This noting of the VLAN and port is called a unique client device identifier learn. A unique key for each row of table 440 is formed from a {unique client device identifier, VLAN} pair.

In some examples, a unique client device identifier can be deleted from table 440 when the unique client device identifier ages out. Aging out can include, for instance, no traffic incipient on the network device for a given time period (e.g., 5 minutes), which is coming from the device that corresponds to the unique client device identifier. The network device then deletes the unique client device identifier record (e.g., a unique client device identifier delete). The port column 448 of a unique client device identifier row can be modified/updated with a different port value if the traffic from the same unique client device identifier and VLAN becomes incipient on a different port (e.g., a unique client device identifier move). Table 440 can include a plurality of entries, including, for instance, 32,000 records, 64,000 records, or 128,000 records, although other amounts are possible.

FIG. 4B illustrates an example table 442 illustrating results of labeling clustered data as frequent, permanent, and/or intermittent. Table 442 may be an extension of table 440, in some examples. That is, column 444 in FIG. 4A may be analogous to column 444 in FIG. 4B, and columns 450, 452, 454, and 456 in FIG. 4B may be placed to the right of column 448 in FIG. 4A. As illustrated in Table 442, post-clustering and based on statistical properties such as unique client device identifier uptime, number of unique client device identifier deletes and/or age-outs, and number of unique client device moves, a unique client device identifier can be labeled as permanent, intermittent, or frequent. Once the classification labels are added (e.g., in column 456), the data set can be run through a supervised machine learning mechanism to create a classifier for determining a classification of a new unique client device identifier arriving at the network device.

Figure 5:
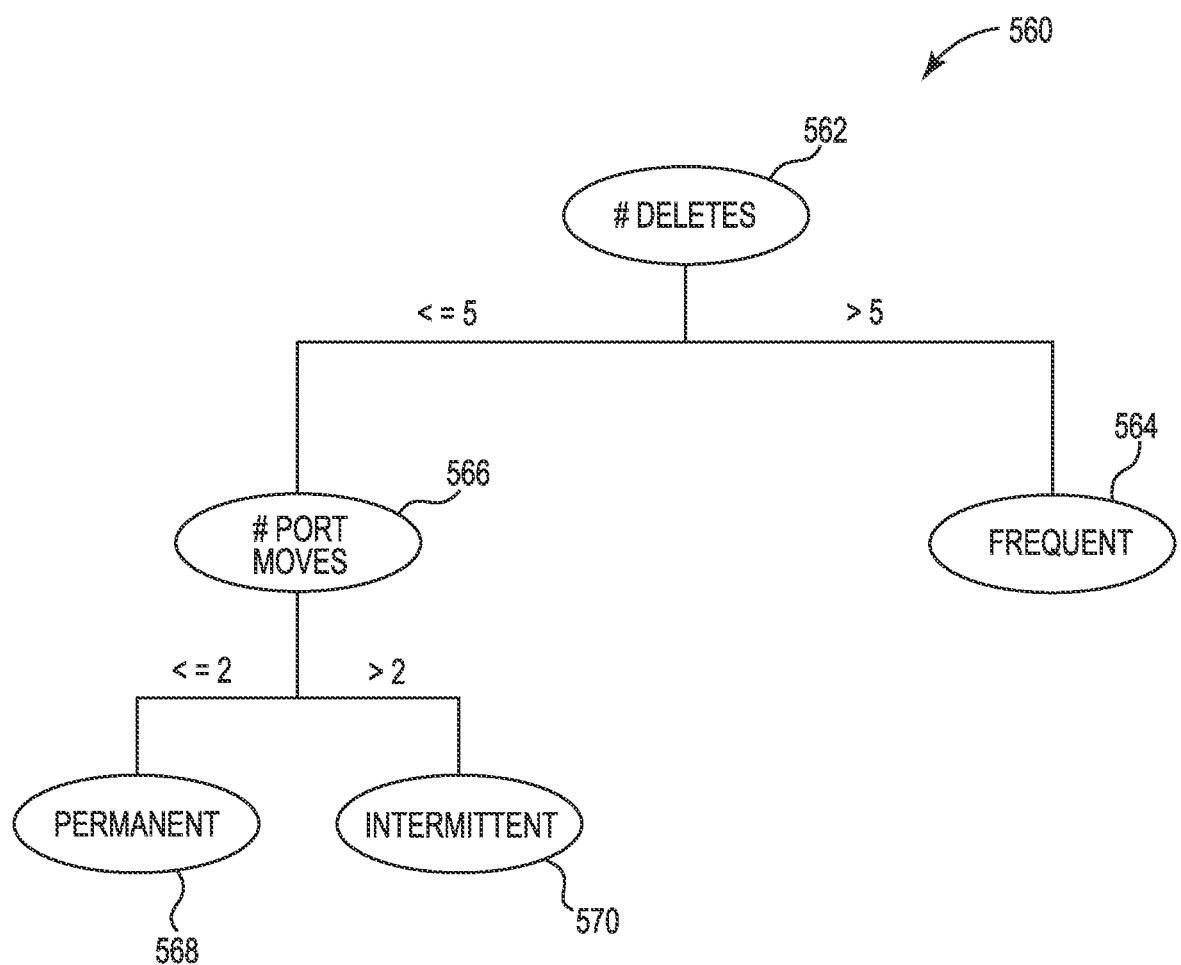
FIG. 5 is an example decision tree for device identifier classification consistent with the present disclosure.

FIG. 5 is an example decision tree 560 for device identifier classification consistent with the present disclosure. For instance, the supervised machine learning mechanism can determine rules to define when and how to classify new unique client device identifiers. The output is a classifier such as decision tree 560. Unique client device identifier classification using a classifier such as decision tree 560 can occur on the network device (e.g., switching device, router, etc.) as a new unique client device identifier is received.

For example, upon receipt of a new unique client device identifier at a network device, the number of unique client device identifier deletes (and/or age-outs) associated with the new unique client device identifier is determined at 562.

In the example illustrated in FIG. 5, if more than 5 unique client device identifier deletes are identified, the new unique client device identifier is classified as frequent at 564. If 5 or fewer unique client device identifier deletes are identified, a determination of the number of unique client device moves ("port moves) 566 associated with the new unique client device identifier is determined. If more than 2 unique client device moves are identified, the new unique client device identifier is classified as intermittent at 570. If 2 or fewer unique client device moves are identified, the new unique client device identifier is classified as permanent 568. More or fewer branches of decision tree 560 may be present, along with more or fewer attributes and/or statistical properties as well as their threshold values. Decision tree 560 allows for continuous and dynamic classification of new unique client device identifier arriving at the network device.

Figure 6:
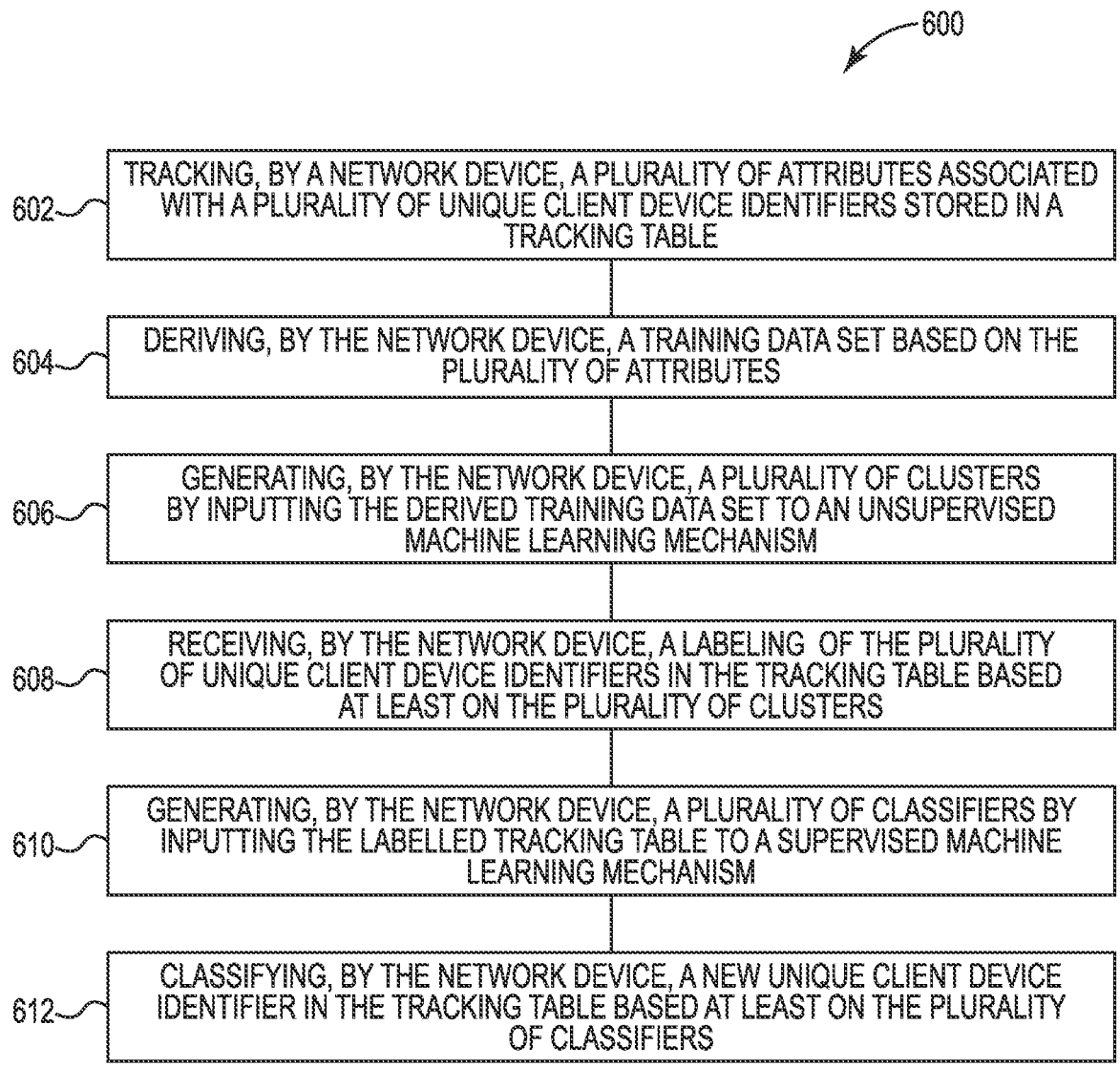
FIG. 6 is an example method for device identifier classification consistent with the present disclosure.

FIG. 6 is an example method 600 for device identifier classification consistent with the present disclosure. Method 600, at 602 can include tracking, by a network device, a plurality of attributes associated with a plurality of unique client device identifiers stored in a tracking table. Tracking the plurality of attributes, in some examples, includes the network device tracking the plurality of attributes such as VLAN and port information and a plurality of statistical properties such as unique client device identifier uptime, number of unique client device identifier deletes and/or age-outs, and unique client device moves associated with the plurality of unique client device attributes.

At 604, method 600 can include deriving, by the network device, a training data set based on the plurality of attributes. The training data set, for instance, can be a data set used with an unsupervised machine learning mechanism. For example, once the plurality of attributes is gathered, the training data set is derived, cleaned (e.g., removal of duplicate records), and fed into a machine learning mechanism. For instance, at 606, method 600 can include generating, by the network device, a plurality of clusters by inputting the derived training data set to an unsupervised machine learning mechanism. The plurality of clusters can be based on the attributes, and responsive to the clustering, the clusters can be labeled.

Method 600, at 608 can include receiving, by the network device, the labeling of the plurality of unique client device identifiers in the tracking table based at least on the plurality of clusters. The labels, for instance, can include permanent, frequent, and intermittent labels, which suggest the type of network of each one of the plurality of unique client device identifiers.

At 610, method 600 can include generating, by the network device, a plurality of classifiers by inputting the labelled tracking table to a supervised machine learning mechanism. The network device generating the plurality of classifiers, in some instances, can include inputting the labelled tracking table into a decision tree supervised machine learning mechanism. The generated plurality of classifiers can be used to classify new unique client device identifiers as they are received by the network device.

For example, method 600, at 612, can include classifying, by the network device, a new unique client device identifier in the tracking table based at least on the plurality of classifiers. For instance, the new unique client device identifier can be classified as frequent, permanent, or intermittent using a decision tree classifier as illustrated in FIG. 5. In some examples, the method 600 can be performed continuously, meaning the network device can dynamically and/or continuously classify the new unique client device identifier responsive to the new unique client device identifier being received at the network device. For instance, the network device continuously receives new unique client device identifiers and dynamically classifies the new unique client device identifiers as they are received.

The continuous and/or dynamic classification can be used to determine network information that provides insights and guidance regarding network utilization, network reachability, network user behavior, etc., that can be used for provisioning of value-added services in the network. Put another way, recognizing patterns and classifications associated with unique client device identifiers on the network can provide insight into users' behavior, which can be used to improve user experience (e.g., deploy more hardware, deploy more services, etc.) on the network in some examples.

In some instances, network user visibility can be based on a determination of a load on a network of a client device having the new unique client device identifier. The load can be determined based on the classification of the new unique client device identifier. For instance, upon a permanent classification, it may be determined the client device will be on the network for some time, meaning the load on the network is greater than a client device having a new unique client device identifier with a frequent classification. Depending on the load determination, insights can be gained with respect to the network user visibility.

In the foregoing detail description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense. Further, as used herein, "a number of" an element and/or feature can refer to any number of such elements and/or features.

What is claimed:

1. A method comprising:
   receiving, by a network device, a first data set associated with a plurality of unique client device identifiers;
   providing, by the network device, the first data set to an unsupervised machine learning mechanism that clusters the first data set into non-overlapping and inclusive categories of data based on a plurality of attributes in the first data set, an output of the unsupervised machine learning mechanism comprising a plurality of clusters based on the plurality of attributes in the first data set;
   in response to receiving the plurality of clusters, automatically generating, by the network device, a labelled data set of the plurality of unique client device identifiers based at least on the plurality of clusters; and
   classifying, by the network device, a new unique client device identifier using a supervised machine learning mechanism that is trained on the labelled data set,
   the network device using both the unsupervised machine learning mechanism and the supervised machine learning mechanism in continuously recognizing network patterns and transforming the network patterns into insights.

2. The method of claim 1, wherein the first data set is generated by tracking a plurality of attributes and a plurality of statistical properties associated with the plurality of unique client device attributes.

3. The method of claim 1, wherein the supervised machine learning mechanism is a decision tree classifier.

4. The method of claim 1, wherein the supervised machine learning mechanism generates a label output corresponding with a frequent, permanent, or intermittent label.

5. The method of claim 1, wherein the classifying is initiated dynamically responsive to the new unique client device identifier being received at the network device.

6. The method of claim 1, wherein the classifying is performed continuously.

7. The method of claim 1, further comprising determining a load of a client device having the new unique client device identifier on a network of the network device based on the classifying.

8. A network device comprising a processing resource in communication with a memory resource including instructions executable to:
receive a first data set associated with a plurality of unique client device identifiers received at the network device;
provide a statistical property of the first data set to an unsupervised machine learning mechanism that clusters the first data set into non-overlapping and inclusive categories of data based on a plurality of attributes in the first data set, an output of the unsupervised machine learning mechanism comprising a plurality of clusters based on the plurality of attributes in the first data set;
automatically generate a labelled data set of the plurality of unique client device identifiers based at least on the plurality of clusters;
classify a new unique device identifier received at the network device using a supervised machine learning mechanism that is trained on the labelled data set, the network device using both the unsupervised machine learning mechanism and the supervised machine learning mechanism in continuously recognizing network patterns and transforming the network patterns into insights.

9. The network device of claim 8, wherein the network device to classify the new unique device identifier further comprises the network device to:
track a plurality of attributes associated with the new unique device identifier;
determine a second statistical property of the new unique device identifier based on the plurality of attributes associated with the new unique device identifier; and
classify the new unique device by inputting the statistical property into the supervised machine learning mechanism.

10. The network device of claim 8, wherein the network device is a switching device.

11. The network device of claim 8, wherein the plurality of unique client device identifiers comprises a plurality of media access control (MAC) addresses.

12. The network device of claim 8, wherein the statistical property comprises a unique client device identifier uptime.

13. The network device of claim 8, wherein the statistical property comprises an amount of unique client device identifier deletes and age-outs.

14. The network device of claim 8, wherein the statistical property comprises an amount of unique client device moves.

15. A non-transitory computer-readable medium storing instructions executable by a processing resource to:
receive a data set associated with a plurality of unique client device identifiers received at a switching device;
provide the data set to an unsupervised machine learning mechanism that clusters the data set into non-overlapping and inclusive categories of data based on a plurality of attributes in the data set, an output of the unsupervised machine learning mechanism comprising a plurality of clusters based on the plurality of attributes in the data set;
create a classifier for each of the plurality of clusters using a supervised machine learning mechanism, training of the classifier being based on labels received by the switching device for each one of the plurality of unique client device identifiers; and
dynamically classify new unique client device identifiers received at the switching device using the classifier for each of the plurality of clusters, using both the unsupervised machine learning mechanism and the supervised machine learning mechanism in continuously recognizing network patterns and transforming the network patterns into insights.

16. The non-transitory computer-readable medium of claim 15, further comprising the instructions executable to create the classifier for each of the plurality of clusters using a decision tree supervised machine learning mechanism.

17. The non-transitory computer-readable medium of claim 15, wherein the unsupervised machine learning mechanism is a K-Means clustering unsupervised machine learning mechanism.

18. The non-transitory computer-readable medium of claim 15, wherein the instructions further comprise clean the data set, assign a training subset of the data set, and assign a testing subset of the data set.

19. The non-transitory computer-readable medium of claim 15, wherein the classifier for each of the plurality of clusters comprise at least one of an intermittent unique client device identifier, a permanent unique client device identifier, or a frequent unique client device identifier.

20. The non-transitory computer-readable medium of claim 15, further comprising instructions executable to make network traffic determinations based on the dynamic classifications.

* * * * *